United States Patent
Sugiura

(10) Patent No.: US 10,684,818 B2
(45) Date of Patent: *Jun. 16, 2020

(54) AUDIO APPARATUS

(71) Applicant: Yamaha Corporation, Hamamatsu-shi, Shizuoka (JP)

(72) Inventor: Daigo Sugiura, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,583

(22) Filed: Aug. 24, 2018

(65) Prior Publication Data

US 2018/0364973 A1    Dec. 20, 2018

Related U.S. Application Data

(63) Continuation of application No. 15/710,357, filed on Sep. 20, 2017, which is a continuation of application (Continued)

(30) Foreign Application Priority Data

Sep. 4, 2009    (JP) ................... 2009-205029

(51) Int. Cl.
  *H04B 3/00*   (2006.01)
  *G06F 3/16*   (2006.01)
  (Continued)

(52) U.S. Cl.
  CPC ............... *G06F 3/165* (2013.01); *H04R 3/12* (2013.01); *H04R 5/02* (2013.01); *G06F 1/1632* (2013.01);
  (Continued)

(58) Field of Classification Search
  CPC ......... G06F 3/165; G06F 1/1632; H04R 3/12; H04R 5/02; H04R 5/04; H04R 2205/021; H04R 2420/05; H04R 2420/07
  (Continued)

(56) References Cited

U.S. PATENT DOCUMENTS

| 5,313,524 | A  | 5/1994 | Van Hulle et al. |
| 8,135,141 | B2 | 3/2012 | Shiba |

(Continued)

FOREIGN PATENT DOCUMENTS

| EP | 1 098 548 A2 | 5/2001 |
| EP | 2 306 752 A2 | 4/2011 |

(Continued)

OTHER PUBLICATIONS

Extended European Search Report dated Aug. 12, 2011 (six (6) pages).

(Continued)

*Primary Examiner* — Ammar T Hamid
(74) *Attorney, Agent, or Firm* — Crowell & Moring LLP

(57) ABSTRACT

An audio apparatus includes a receiver, a sound emitter, a generator, and a transmitter. The receiver receives audio data transmitted by a broadcast method from an external apparatus. The sound emitter performs sound emission of the audio data received by the receiver. The generator generates sound emission control information relating to sound emission of other apparatus which can receive the audio data. The transmitter transmits the sound emission control information generated by the generator to the other apparatus.

12 Claims, 5 Drawing Sheets

Related U.S. Application Data

No. 15/098,578, filed on Apr. 14, 2016, which is a continuation of application No. 12/875,256, filed on Sep. 3, 2010, now Pat. No. 9,344,799.

(51) Int. Cl.
*H04R 3/12* (2006.01)
*H04R 5/02* (2006.01)
*G06F 1/16* (2006.01)
*H04R 5/04* (2006.01)

(52) U.S. Cl.
CPC .......... *H04R 5/04* (2013.01); *H04R 2205/021* (2013.01); *H04R 2420/05* (2013.01); *H04R 2420/07* (2013.01)

(58) Field of Classification Search
USPC ...................................................... 381/80, 77
See application file for complete search history.

(56) References Cited

U.S. PATENT DOCUMENTS

| | | | |
|---|---|---|---|
| 8,320,824 B2 | 11/2012 | Banks et al. | |
| 8,660,055 B2* | 2/2014 | Ueda | H04B 1/385 370/315 |
| 2003/0185400 A1 | 10/2003 | Yoshizawa et al. | |
| 2005/0190928 A1 | 9/2005 | Noto | |
| 2007/0160225 A1* | 7/2007 | Seydoux | H04W 8/005 381/79 |
| 2007/0297459 A1 | 12/2007 | Cucos et al. | |
| 2008/0075295 A1 | 3/2008 | Mayman et al. | |
| 2008/0089268 A1 | 4/2008 | Kinder et al. | |
| 2008/0226094 A1* | 9/2008 | Rutschman | H04R 5/033 381/79 |
| 2008/0248742 A1 | 10/2008 | Bauer et al. | |
| 2009/0109894 A1 | 4/2009 | Ueda et al. | |
| 2009/0169030 A1 | 7/2009 | Inohara | |
| 2010/0322455 A1 | 12/2010 | Carlson | |
| 2011/0299689 A1 | 12/2011 | Avtzon et al. | |

FOREIGN PATENT DOCUMENTS

| | | |
|---|---|---|
| EP | 3 324 648 A1 | 5/2018 |
| JP | 6-180974 A | 6/1994 |
| JP | 2005-79614 A | 3/2005 |
| JP | 2005-341618 A | 12/2005 |
| JP | 2006-140824 A | 6/2006 |
| JP | 2007-97097 A | 4/2007 |
| JP | 2008-522468 A | 6/2008 |
| JP | 2009-60370 A | 3/2009 |
| WO | WO 2009/067669 A1 | 5/2009 |

OTHER PUBLICATIONS

Japanese Office Action dated Apr. 3, 2014, with English translation (six (6) pages).
European Application No. 10 009 145.3, Examination Report dated Feb. 16, 2015 (five (5) pages).
Extended European Search Report issued in counterpart European Application No. 10 009 145.3 dated Nov. 30, 2015 (Four (4) pages).
Japanese-language Office Action issued in counterpart Japanese Application No. 2015-172034 dated Jul. 27, 2016 with English translation (Six (6) pages).
Extended European Search Report issued in counterpart European Application No. 17191102.7 dated Apr. 20, 2018(nine (9) pages).
Non-Final Office Action issued in U.S. Appl. No. 15/098,578 dated Nov. 28, 2018.
Non-Final Office Action issued in U.S. Appl. No. 15/710,357 dated Mar. 15, 2018.
European Office Action issued in counterpart European Application No. 17191102.7 dated Apr. 18, 2019 (eight (8) pages).
Non-Final Office Action issued in U.S. Appl. No. 15/710,357 dated Feb. 7, 2019 pp. 1-11 (14 pages).
Office Action issued in U.S. Appl. No. 15/098,578 dated Jul. 3, 2019.
Office Action issued in U.S. Appl. No. 15/710,357 dated Oct. 16, 2019.

* cited by examiner

FIG. 3A

| VOLUME | 125 |
|---|---|
| BAND | 40～33kHz |

FIG. 3B

| VOLUME | SPEAKER APPARATUS | | SW |
|---|---|---|---|
| | 125 | | 125 |
| BAND | 100～33kHz | | 20～100kHz |

…

AUDIO APPARATUS

CLAIM OF PRIORITY

This application is a continuation of U.S. application Ser. No. 15/710,357, filed Sep. 20, 2017, which is a continuation of U.S. application Ser. No. 15/098,578, filed Apr. 14, 2016, which is a continuation of U.S. application Ser. No. 12/875,256, filed Sep. 3, 2010, now U.S. Pat. No. 9,344,799, issued May 17, 2016, which claims priority from Japanese Patent application no. 2009-205029, filed Sep. 4, 2009, the disclosures of which are expressly incorporated by reference herein.

BACKGROUND OF THE INVENTION

The present invention relates to an audio apparatus which performs output control between receivers that receive audio data.

JP-A-2006-140824 discloses an audio system in which a sub-woofer is wire connected to an audio amplifier, an audio signal is transmitted from the audio amplifier to the sub-woofer, and the sub-woofer extracts and outputs the low-frequency component of the audio signal.

The audio amplifier of the audio system is provided with a sub-woofer power button for controlling the power supply of the sub-woofer from the side of the audio amplifier. When the sub-woofer power button is pressed by the user, the audio amplifier combines the audio signal with a high-frequency signal which is higher in frequency than the audio signal of the audible range, and outputs the resulting combined signal to the sub-woofer. The sub-woofer extracts a low-frequency audio signal from the combined signal, and extracts also a high-frequency component signal, whereby switching the ON/OFF states of the power supply.

As described above, an operation in which a receiver is controlled from the transmitter side, such as that in which the ON/OFF states of the power supply for the sub-woofer that is the reception side is switched by the audio amplifier that is a transmitter of audio data is usually performed.

In the case where a plurality of receivers receive the same audio data and simultaneously output the data, for example, the volumes and ranges of the sounds output by the receivers must be adjusted in a well balanced manner. For example, the case where one receiver handles L- and R-channels, and another receiver is in charge of the function of a sub-woofer is considered. Adjustments of the sound volume and the band are necessary between the receivers. In such a case, when a configuration where an operation button for controlling the receivers is disposed in a transmitter and the control is performed through the button is employed as in the above-described related art, the receivers require individual adjustments, respectively, and such adjustments are cumbersome.

SUMMARY

It is therefore an object of the invention to provide an audio apparatus which can automatically control the output state of audio data among receivers.

In order to achieve the object, according to the invention, there is provided an audio apparatus comprising: a receiver which receives audio data transmitted by a broadcast method from an external apparatus; a sound emitter which performs sound emission of the audio data received by the receiver; a generator which generates sound emission control information relating to sound emission of other apparatus which can receive the audio data; and a transmitter which transmits the sound emission control information generated by the generator to the other apparatus.

The audio apparatus may further include: a detector which detects connection with the other apparatus. when the detector detects the connection with the other apparatus by the detector, the generator may generate the sound emission control information.

According to the invention, there is also provided an audio apparatus comprising: a data receiver which receives audio data transmitted by a broadcast method from an external apparatus; a control information receiver which receives sound emission control information relating to sound emission of the audio data, from other apparatus which can receive the audio data; and a sound emitter which emits the audio data received by the data receiver, in accordance with the sound emission control information received by the control information receiver.

According to the invention, there is also provided an audio apparatus comprising: a receiver which receives audio data transmitted by a broadcast method from a first apparatus; a sound emitter which performs sound emission of the audio data received by the receiver; a generator which generates sound emission control information relating to sound emission of a second apparatus which can receive the audio data; and a transmitter which specifies the second apparatus and transmits the sound emission control information generated by the generator to the second apparatus.

BRIEF DESCRIPTION OF THE DRAWINGS

FIG. 3A is a view showing a data example of set information in the case where sound emission is performed only by the speaker apparatus, and FIG. 3B is a view showing a data example of set information in the case where sound emission is performed by the speaker apparatus and a sub-woofer apparatus.

DETAILED DESCRIPTION OF EMBODIMENTS

Summary

Figure 1:
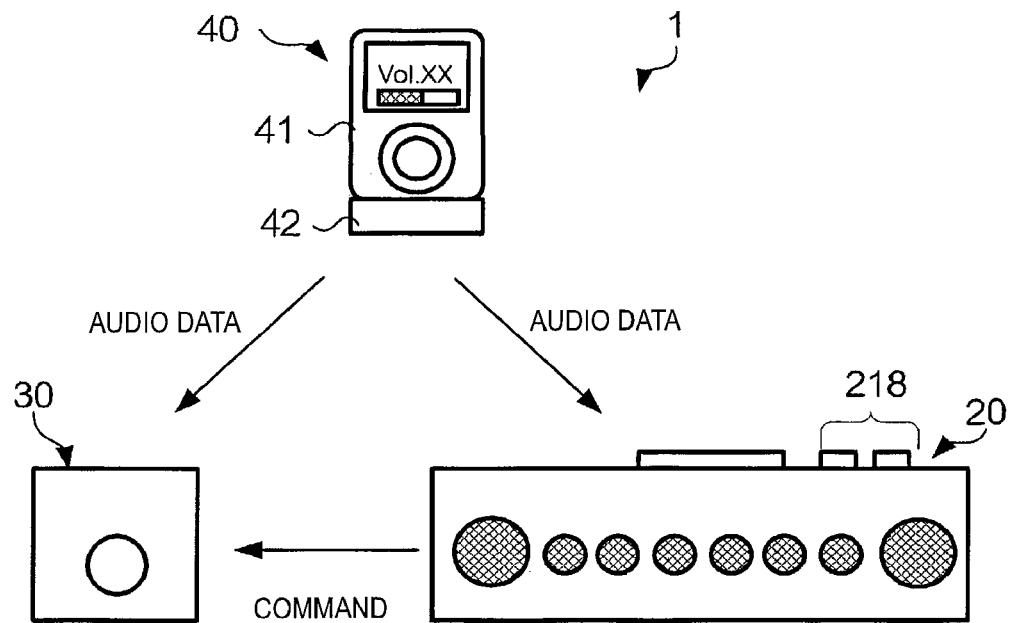
FIG. 1 is a diagram showing an example of the system configuration of an audio system which is an embodiment.

FIG. 1 is a system diagram of an audio system which is an embodiment. As shown in FIG. 1, the audio system 1 includes a speaker apparatus 20, a sub-woofer apparatus (hereinafter, referred to as SW) 30 which emits a low-frequency sound, and a communication apparatus 40. These apparatuses have a communication function. A wireless link is established between the communication apparatus 40 and the speaker apparatus 20, and between the communication apparatus 40 and the SW 30.

The communication apparatus 40 is configured by a portable audio apparatus 41 and communication module 42 which are detachable from each other. When the portable audio apparatus 41 is attached to the communication module 42, the communication module 42 packetizes audio data such as a music piece which is output from the portable audio apparatus 41, then transmits a stream of the data by a broadcast method through the communication module 42. The speaker apparatus 20 and the SW 30 receive the audio data output from the communication apparatus 40, and emits a sound in accordance with a volume value and sound range which are preset.

In reception of audio data, the speaker apparatus 20 establishes a wireless link with the SW 30 to be wirelessly connected thereto, and transmits to the SW 30 a sound emission control command including sound emission control information instructing about a volume value and reproduction band which are used in the SW 30. In accordance with the sound emission control command transmitted from the speaker apparatus 20, the SW 30 emits the audio data received from the communication apparatus 40. Hereinafter, these apparatuses will be described in detail.

Configuration

Configuration of Speaker Apparatus 20

Figure 2:
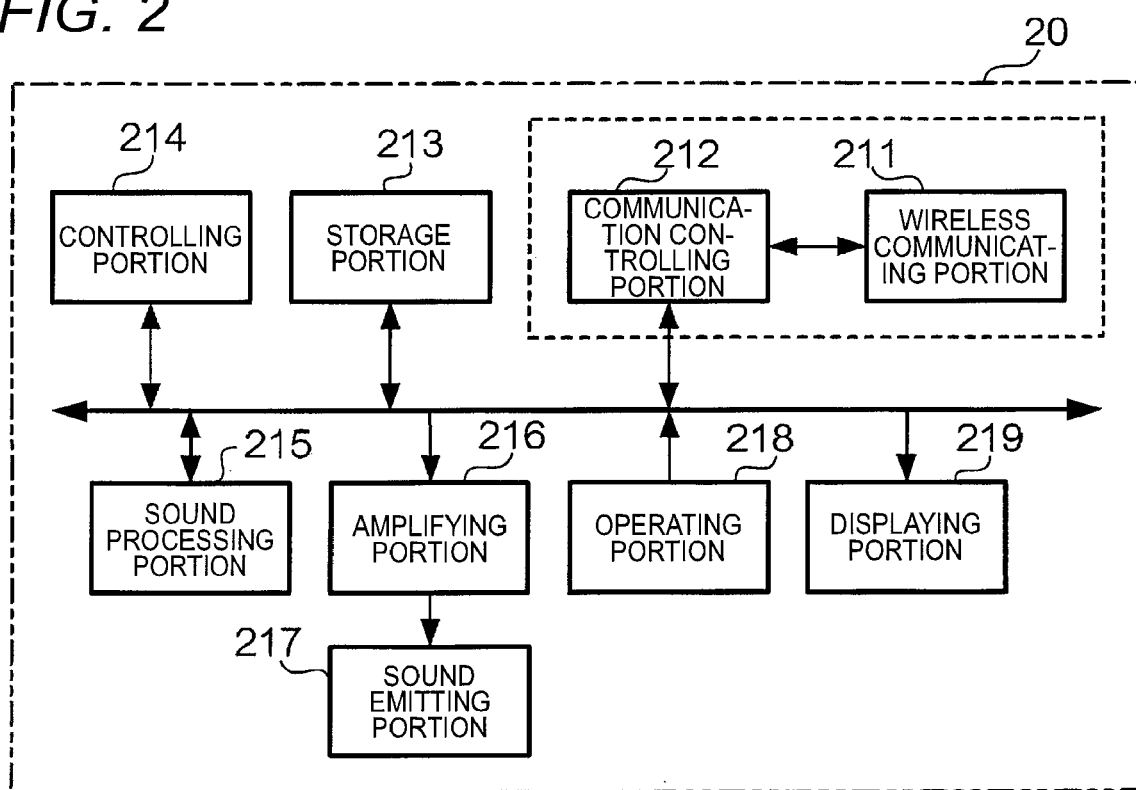
FIG. 2 is a block diagram of a speaker apparatus in the embodiment.

FIG. 2 is a block diagram of the speaker apparatus 20. Hereinafter, portions shown in FIG. 2 will be described. A wireless communicating portion 211 performs wireless communication with another apparatus under control of a communication controlling portion 212. The wireless communicating portion 211 detects another apparatuses which is communication connectable in a communication range according to the strength of a radio wave, and establishes a wireless link at the physical layer level. When a wireless link with the communication apparatus 40 is established and a communicable state is obtained, the wireless communicating portion 211 receives audio stream data transmitted from the communication apparatus 40, and sends the data to the communication controlling portion 212.

The communication controlling portion 212 has functions of, under control of a controlling portion 214, controlling the wireless communicating portion 211 so as to perform various communication processes such as establishment of a wireless link with another apparatus, cutoff of the wireless link, and transmission and reception of data with respect to an apparatus with which a wireless link is established, and transmitting the received audio data to a sound processing portion 215.

A storage portion 213 is a storage medium such as a nonvolatile memory, and stores the reproduction bands of the present apparatus and the SW 30, and also the volume of the sound emission. When the operator operates an operating portion 218, the value of the volume is adequately changed. Each time when the value is changed, the value is updated and stored in the storage portion 213. Hereinafter, the combination of the reproduction band and the volume is referred to as set information.

FIGS. 3A and 3B show examples of set information in the embodiment. FIG. 3A shows a data example of set information in the case where sound emission is performed only by the speaker apparatus 20. As shown in FIG. 3A, in the embodiment, the volume value which is currently set by a user's operation, and the reproduction band of the speaker apparatus 20 are stored. In this example, "125" is set as the volume value which may be in the range of from "0" to "255", and 40 to 33 kHz is set as the reproduction band.

FIG. 3B shows a data example of set information in the case where sound emission is performed by the speaker apparatus 20 and the SW 30. As shown in FIG. 3B, in this case, the volume values and bands of both the speaker apparatus 20 and the SW 30 are written. With respect to the band, a default value is set, but the band can be changed by a user's operation.

In the embodiment, an example in which the volume value that is identical with the volume value of the set information is set in the speaker apparatus 20 and the SW 30 will be described. In the case where, for example, a ratio of the volume value of the SW 30 to that of the speaker apparatus 20 is previously set, volume values of the speaker apparatus 20 and the SW 30 according to the ratio with respect to the volume value which is currently set in the speaker apparatus 20 may be set. In the above-described example, the volume and the reproduction band are set. Information relating to the delay time of sound emission, the sound effect, and the like may be included in the set information.

Returning to FIG. 2, the controlling portion 214 includes a CPU (Central Processing Unit), a ROM (Read Only Memory), and a RAM (Random Access Memory). The CPU has a function of loading a control program stored in the ROM into the RAM and executing the program, thereby controlling the various portions of the speaker apparatus 20. Particularly, the controlling portion 214 has a function of, when audio data are received from the communication apparatus 40, extracting set information of the volume value and band of the SW 30 stored as the set information, and giving instructions in the form of a command.

Figure 4:
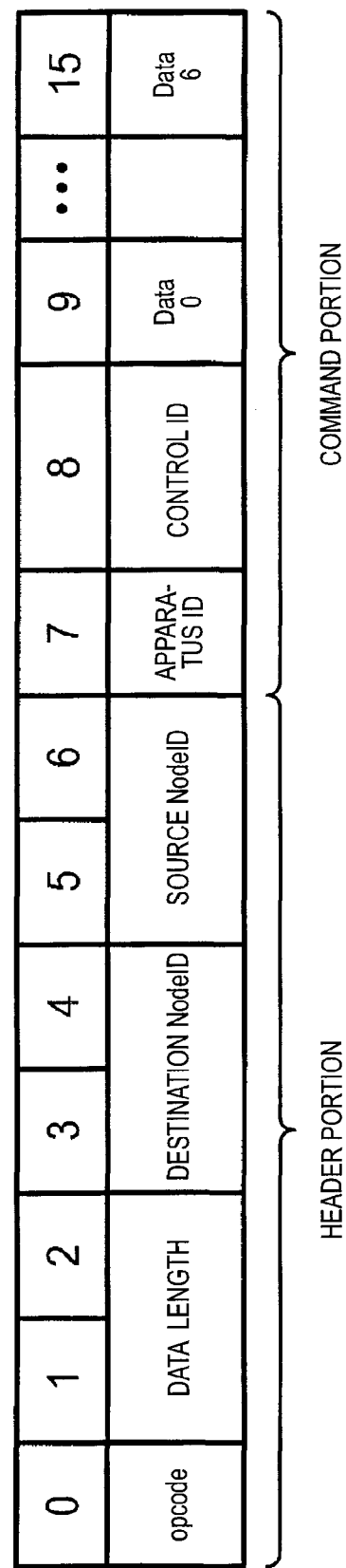
FIG. 4 is a view showing a configuration example of a command in the embodiment.

A configuration example of a command used in the embodiment will be described with reference to FIG. 4. FIG. 4 is a view showing an example of the sound emission control command which is transmitted from the speaker apparatus 20 to the SW 30. As shown in FIG. 4, data of the sound emission control command are configured by, for example, 16 bytes, and include a header portion and a command portion.

The header portion includes: an opcode indicating the sequence number of the command; the data length of the command data; a destination NodeID indicating an apparatus to which the command is to be transmitted; and a source NodeID indicating an apparatus from which the command is transmitted. With respect to the destination NodeID and the source NodeID, the IDs of the apparatuses are set when data are exchanged between the SW 30 and the speaker apparatus 20. In the embodiment, when a wireless link with the communication apparatus 40 is established, the communication apparatus 40 allocates these IDs as IDs for identifying the apparatuses.

The command portion includes an apparatus ID, a control ID, and a data portion of Data 0, ..., Data 6. In the apparatus ID, information indicating the apparatus kind of the SW is set. In the control ID, information indicating the substance of the command, such as notification of a change of the volume value, and instructions for setting the band are set. In the data portion, data of contents which are instructed by commands corresponding to the command IDs are set.

Returning to FIG. 2, the description of the configuration of the speaker apparatus 20 is continued. The sound processing portion 215 is configured by a DSP (Digital Signal Processor) and the like, and has functions of, under control of the controlling portion 214, performing a sound process such as extraction of audio data corresponding to the reproduction band of the speaker apparatus 20 from audio data transmitted from the communication controlling portion 212, on the basis of the sound emission control information of the speaker apparatus 20, DA converting the extracted data, and sending the resulting data to an amplifying portion 216.

The amplifying portion 216 amplifies the audio signal output from the sound processing portion 215, and outputs the amplified signal to a sound emitting portion 217. In the embodiment, in the sound emitting portion 217, a speaker array is configured by a plurality of speakers, and sound beams corresponding to channels of the audio signal are output.

The operating portion 218 has operating devices (including buttons, knobs, and switches) for inputting user instructions, and outputs an operation signal corresponding to a user's operation on the operating devices. When the user operates a knob for adjusting the volume, for example, the volume which is currently set in the speaker apparatus 20 can be changed. A displaying portion 219 has a function of, under control of the controlling portion 214, displaying a menu screen for operating the speaker apparatus 20, a setting screen for changing set information, and the like. Next, the configuration of the SW 30 will be described.

Configuration of SW 30

Figure 5:
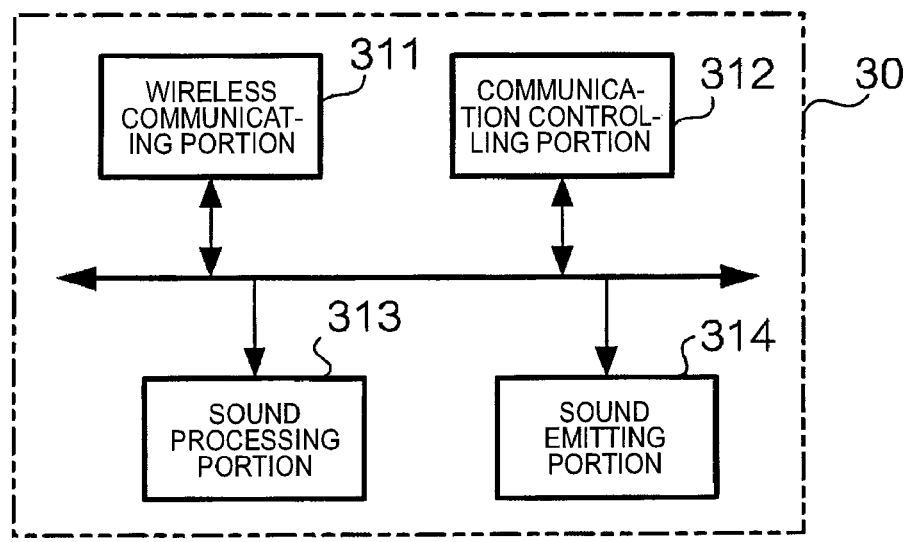
FIG. 5 is a block diagram of the sub-woofer apparatus in the embodiment.

FIG. 5 is a block diagram showing the configuration of the SW 30. Similarly with the above-described wireless communicating portion 211, a wireless communicating portion 311 has a function of, under control of a communication controlling portion 312, performing wireless communication with another apparatus.

Similarly with the above-described communication controlling portion 212, the communication controlling portion 312 has a function of controlling various communication processes performed by the wireless communicating portion 311. A sound processing portion 313 has a function of, based on the reproduction band set in the SW 30, performing a sound process such as extraction of low-frequency audio data from audio data transmitted from the wireless communicating portion 311, and sending the processed audio data to a sound emitting portion 314.

The sound emitting portion 314 has: an amplifying circuit which amplifies a musical sound waveform signal of the audio data output from the sound processing portion 313, at an amplification factor corresponding to the set volume value; and a speaker which emits the amplified musical sound waveform signal.

Configuration of Communication Apparatus 40

Figure 6:
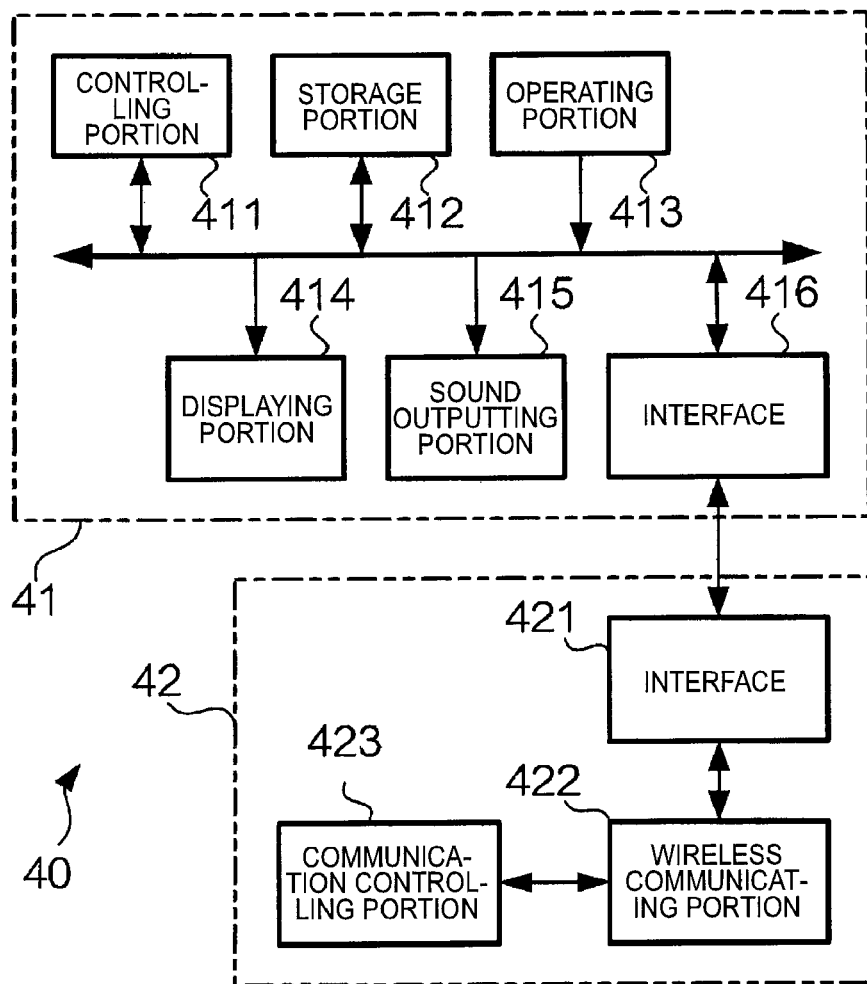
FIG. 6 is a block diagram of a communication apparatus in the embodiment.

FIG. 6 is a block diagram showing the configuration of the communication apparatus 40. As shown in FIG. 6, the communication apparatus 40 includes the portable audio apparatus 41 and the communication module 42. The portable audio apparatus 41 is supplied with an electric power from a power supplying portion (not shown) such as a battery, and connected to the communication module 42 through interfaces 416, 421. The embodiment is configured so that, when the communication module 42 is connected to the portable audio apparatus 41, the module is supplied with an electric power from a power supplying portion (not shown) in the portable audio apparatus 41. Alternatively, a battery for supplying a power to the portions in the communication module 42 may be disposed in the communication module 42. Hereinafter, the portions of the apparatuses will be described.

The portable audio apparatus 41 includes a controlling portion 411, a storage portion 412, an operating portion 413, a displaying portion 414, a sound outputting portion 415, and the interface 416. The controlling portion 411 includes a CPU, a ROM, and a RAM. The CPU has a function of reading a control program from the ROM into the RAM, and executing the program to control the portions of the portable audio apparatus 41. Specifically, when the communication module 42 is connected to the interface 416, audio data which are selected by the user from the audio data in the storage portion 412 described later are sent to the interface 416, and then output to the communication module 42.

The storage portion 412 is a storage unit such as a hard disk or a nonvolatile memory, and stores information such as contents data, for example, music pieces and videos, and the volume value in reproduction of contents. The operating portion 413 has an operating device which is to be operated by the user, and a function of, in accordance with a user's operation on the operating device, sending a signal indicative of contents of the operation to the controlling portion 411. For example, the operating device is a rotationally operable operating device or the like. When the operating device is clockwise rotated, it may be instructed to increase the volume value, and, when the operating device is counterclockwise rotated, it may be instructed to decrease the volume value.

The displaying portion 414 is configured by a display device such as an LCD, and has a function of, under control of the controlling portion 411, displaying an image such as a motion picture or a still picture. The sound outputting portion 415 has a connecting terminal to which a sound emitting unit such as a headphone is connected, and has a function of outputting the audio signal supplied from the controlling portion 411, through the sound emitting unit. The interface 416 is a connecting terminal to which an external apparatus such as the communication module 42 is connected to mediate the data that are exchanged with the external apparatus.

Next, the configuration of the communication module 42 will be described. The communication module 42 includes the interface 421, a wireless communicating portion 422, and a communication controlling portion 423.

The wireless communicating portion 422 and the communication controlling portion 423 have functions which are similar to those of the wireless communicating portion 211 and communication controlling portion 212 of the speaker apparatus 20 that have been described above, and also a function of performing wireless communication with an external apparatus.

Similarly with the interface 416 of the portable audio apparatus 41, the interface 421 is a connecting terminal to which an external apparatus is connected to mediate exchange of data with the connected apparatus. In the embodiment, the interface is connected to the portable audio apparatus 41, receives audio data from the portable audio apparatus 41, and sends the data to the wireless communicating portion 422.

Operation

Next, the operation of the audio system 1 of the embodiment will be described. The communication apparatus 40, the speaker apparatus 20, and the SW 30 are powered ON, and the communication apparatus 40 transmits a master request for functioning as a master by a broadcast method. The speaker apparatus 20 and the SW 30 search whether the master is within the communication range or not, and, when receiving the master request from the communication apparatus 40, a link is established with the communication apparatus 40.

Then, the communication module 42 of the communication apparatus 40 allocates IDs for respectively identifying the speaker apparatus 20 and the SW 30 to the apparatuses, and transmits a connection request signal containing the allocated IDs and an ID for identifying the communication module 42. The speaker apparatus 20 and the SW 30 store the respective allocated IDs into the own apparatuses, and transmit a signal reply to the connection request signal to the communication apparatus 40. Therefore, wireless communications between the communication apparatus 40 and the speaker apparatus 20, and the communication apparatus 40 and the SW 30 are enabled, and the state transits to that where a stream of audio data can be transmitted from the communication apparatus 40 to the speaker apparatus 20 and the SW 30. When, in the portable audio apparatus 41, audio data are selected by a user's operation and reproduction instructions are issued, transmission of a stream of the audio data from the communication apparatus 40 to the speaker apparatus 20 and the SW 30 is started.

Figure 7:
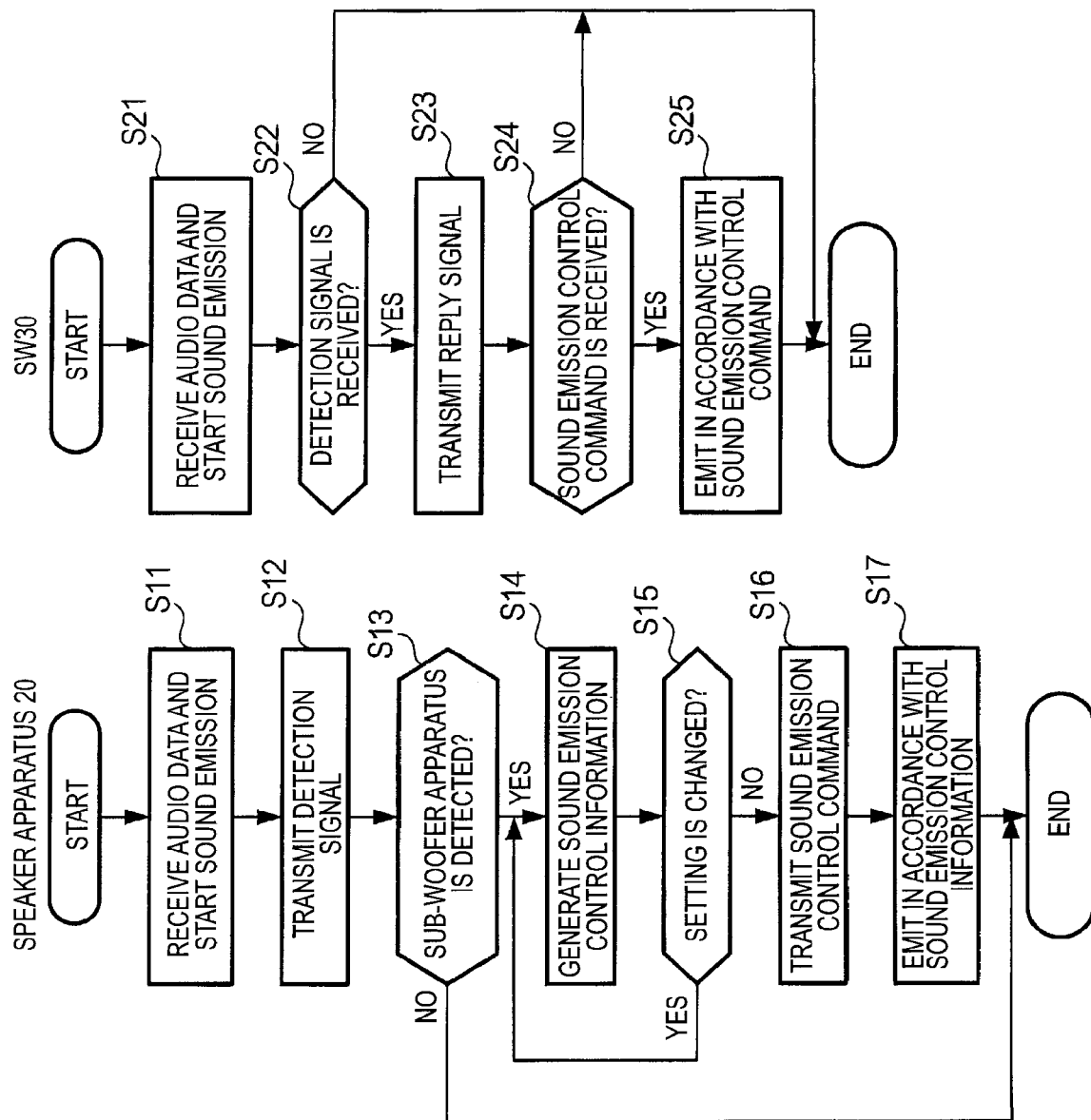
FIG. 7 is a view showing the operation flow of the audio system of the embodiment.

Hereinafter, the operations which are performed by the speaker apparatus 20 and the SW 30 in the above-described state will be described with reference to the operation flow of FIG. 7.

The speaker apparatus 20 sequentially receives the audio data from the communication apparatus 40, extracts audio data corresponding to the reproduction band according to the set information which is stored in the storage portion 213, and DA converts the extracted data to generate an audio signal. The amplifying portion 216 amplifies the audio signal at an amplification factor corresponding to the volume value which is set in the set information, and sends the amplified signal to the sound emitting portion 217. In this case, the reproduction band is determined on the basis of the set information shown in FIG. 3A, and hence emission of audio data of intermediate/high frequency band is started (step S11).

On the other hand, similarly with the speaker apparatus 20, also in the SW 30, the audio data from the communication apparatus 40 are sequentially received, low-frequency audio data are extracted from the received audio data in the sound processing portion 313, and the audio signal is amplified at an amplification factor which is preset, and emitted from the sound emitting portion 314 (step S21). Therefore, the SW 30 emits the low-frequency audio data. The band in this case is a default band which is preset in the SW 30. Alternatively, the band which is set in the previous setting may be used in place of the default band.

On the other hand, the controlling portion 214 of the speaker apparatus 20 controls the communication controlling portion 212 to output a detection signal for detecting the SW which can be wirelessly connected, from the wireless communicating portion 211 (step S12). The detection signal contains information indicative of the ID of the speaker apparatus 20.

If the SW 30 receives the detection signal which is transmitted in step S12 from the speaker apparatus 20 through the wireless communicating portion 311 (step S22: YES), in response to the detection signal, the SW 30 transmits a reply signal containing information indicative of the ID allocated to the SW 30, to the speaker apparatus 20 (step S23). As a result of the process, the speaker apparatus 20 and the SW 30 are in the state where wireless communication is enabled.

If the controlling portion 214 of the speaker apparatus detects the reply signal from the SW 30, or if the SW 30 is detected (step S13: YES), the controlling portion extracts information relating to the SW from the set information which is stored in the storage portion 213, and which is shown in FIG. 3B, and generates the sound emission control information (step S14).

The controlling portion 214 determines whether the set information is changed or not (step S15). If the user performs an operation of changing the setting of the volume or the like through the operating portion 218 (step S15: YES), for example, the control returns to step S14, the set information is updated, and the sound emission control information is generated from the updated set information.

If the set information is not changed, or if, after updation of the set information, the set information is not again changed (step S15: NO), the control proceeds to step S16. In this case, a sound emission control command in which, in the command of FIG. 4, the ID allocated to the SW 30 is set as the destination NodeID, information indicative of instructions for setting the band is set as the control ID, and the sound emission control information indicative of the band of the SW 30 is set in the data portion is generated, and the generated command is transmitted to the SW 30. If the volume value is changed, also a sound emission control command in which information indicating notification of a change of the volume value is set as the control ID, and the sound emission control information indicative of the volume value of the SW 30 is set in the data portion is generated, and the generated command is transmitted to the SW 30 (step S16).

The controlling portion 214 controls the sound processing portion 215 so as to attain the band and volume corresponding to the set information shown in FIG. 3B. As a result, an audio signal of a band and a volume which are set in accordance with the case where the SW exists is emitted from the speaker apparatus 20 (step S17).

On the other hand, if the communication controlling portion 312 of the SW 30 receives the sound emission control command from the speaker apparatus 20 through the wireless communicating portion 311 (step S24: YES), the communication controlling portion sends the received sound emission control command to the sound processing portion 313. In the sound processing portion 313, audio data of the band instructed by the sound emission control command are extracted from audio data which are sequentially received through the wireless communicating portion 311, and the musical sound waveform signal of the audio data is amplified at an amplification factor corresponding to the volume value instructed in the sound emission control command, and then output from the sound emitting portion 314 (step S25).

If, in step S13, the reply signal from the SW 30 cannot be detected and the SW 30 cannot be detected (step S13: NO), the controlling portion 214 of the speaker apparatus 20 continues the process of step S11, thereby continuing emission of audio data according to the set information of the speaker apparatus 20.

If, in step S22, the detection signal is not received through the wireless communicating portion 311 of the SW 30 (step S22: NO), or if, in step S24, the communication controlling portion 312 of the SW 30 does not receive the sound emission control command from the speaker apparatus 20 through the wireless communicating portion 311 (step S24: NO), the process of step S11 is continued, so that the SW 30 emits the audio signal of the volume and band which are set by default (or in the previous time).

Alternatively, a mute process may be performed so that sound emission is not conducted, until "YES" is obtained in step S22.

In the embodiment, as described above, the reproduction band of the speaker apparatus 20 is automatically switched over depending on whether the SW 30 exists or not in the audio system 1, and, in the case where audio data transmitted from the communication apparatus 40 are emitted from the speaker apparatus 20 and the SW 30, the speaker apparatus 20 instructs the SW 30 about control information of the volume and band relating to sound emission, whereby the volumes and bands of the speaker apparatus 20 and the SW 30 can be adjusted in a well balanced manner.

Modifications

Although the embodiment of the invention has been described, the invention is not limited to the above-described embodiment, and includes also the following modifications.

(1) Although, in the above embodiment, the example in which the speaker apparatus 20 and the SW 30 receive audio data from the communication apparatus 40 and emit the audio data has been described, audio data which are obtained by the speaker apparatus 20 from an apparatus other than the communication apparatus 40 may be transmitted to the SW 30. In an example of such a case, audio data are obtained from a DVD player or the like which is wire connected to the speaker apparatus 20, and then transmitted to the SW 30. In the case where the speaker apparatus 20 includes a sound source or the like, audio data may be generated in the speaker apparatus 20 and then transmitted to the SW 30, or audio data which are previously stored in the storage portion 213 are read out and then transmitted to the SW 30.

In the above-described case, the wireless connection between the speaker apparatus 20 and the SW 30 may be performed in the following manner. When an operation of obtaining audio data is performed by user, the controlling portion 214 of the speaker apparatus 20 detects the SW 30, and a wireless link with the SW 30 is established. With respect to transmission of the sound emission control command containing the sound emission control information to the SW 30, when the wireless link with the SW 30 is established, the sound emission control information of the speaker apparatus 20 and the SW 30 is generated in a similar manner as step S14 of FIG. 7, the sound emission control command containing the sound emission control information is transmitted to the SW 30, and the obtained audio data are packetized and then sequentially transmitted to the SW 30. In this case, for example, the audio data and the command data may be transmitted in a time sharing manner.

(2) Although, in the above embodiment, the example in which, when receiving audio data from the communication apparatus 40, the speaker apparatus 20 performs the detection of the SW 30 has been described, the detection of the SW 30 may be performed before reception of the audio data, for example, when the wireless link between the speaker apparatus 20 and the communication apparatus 40 is established, or when the speaker apparatus 20 is powered ON.

(3) Although, in the above embodiment, the example in which the command instructing about the band and volume value of the sound emission from the SW 30 as the sound emission control information is transmitted from the speaker apparatus 20 to the SW 30 has been described, at least one of the band and the volume value may be instructed by a command, or, in addition to the band and the volume value, control information relating to sound emission of the SW 30 such as information of a delay time by which the sound emission of the SW 30 is delayed from that of the speaker apparatus 20 may be contained in the command.

(4) Although, in the above embodiment, the example in which receivers which receive audio data from the communication apparatus 40 are the speaker apparatus 20 and the SW 30 has been described, the number of receivers may be three or more. In such a case, a master apparatus which transmits a command is selected from the receivers, and the master apparatus which transmits a command detects the other receivers and establishes a wireless link.

In accordance with set information such as the volume value which is set in the master apparatus, the master apparatus generates sound emission control information such as volume values of the receivers, and instructs by a command the other receivers about the sound emission control information. The master apparatus which transmits a command may be manually selected by a user's operation, or automatically selected by a predetermined algorithm in which a receiver is determined whether it behaves as a mater apparatus or not, in accordance with the number or kinds of apparatuses that are wire connected to the receiver, or functions of the receiver.

(5) Although, in the above embodiment, the example in which, when the speaker apparatus 20 detects the SW 30, the command containing sound emission control information in which the ID of the detected SW 30 is set is transmitted has been described, the process of detecting the SW 30 may not be performed, and a sound emission control command in which information indicative of an apparatus that can receive audio data is set in an apparatus ID may be transmitted by a broadcast method. In this case, when information set in the apparatus ID of the sound emission control command which is transmitted by a broadcast method indicates a device of the present apparatus, the sound emission control command is received, and audio data received from the communication apparatus 40 are emitted in accordance with the sound emission control command.

(6) Although, in the above embodiment, the example in which, the speaker apparatus 20 establishes a wireless link with the SW 30 to be wirelessly connected thereto has been described, the speaker apparatus 20 and the SW 30 may be wire connected to each other. Also, the communication apparatus 40 and the speaker apparatus 20 may be wire connected to each other, and the communication apparatus 40 and the SW 30 may be wire connected to each other.

According to an aspect of the invention, the present apparatus can receive and emit the audio stream data transmitted from the external apparatus, and can control sound emission of the other apparatus which can receive the audio stream data.

According to an aspect of the invention, the sound emission can be controlled while surely specifying the other apparatus which can receive the audio stream data.

According to an aspect of the invention, sound emission can be performed in accordance with the control by the other apparatus which can receive the audio stream data received by the present apparatus.

What is claimed is:

1. An audio system comprising:
   a communication apparatus configured to store audio data;
   a first speaker apparatus having a first network interface configured to receive the audio data from the communication apparatus and the first speaker apparatus configured to output an audio signal based on the received audio data; and a second speaker apparatus having a second network interface configured to receive the audio data from the communication apparatus and the second speaker apparatus configured to output an audio signal based on the received audio data, wherein the first speaker apparatus detects connection with the second speaker apparatus and transmits the audio data received from the communication apparatus via the first network interface and set information to the second speaker apparatus;

wherein the second speaker apparatus outputs an audio signal based on the audio data received from the first speaker apparatus in accordance with the set information, wherein the set information includes one or more of the following: (i) a sound volume and (ii) a frequency band, and when a ratio of the volume value of the second speaker apparatus to that of the first speaker apparatus is previously set, the volume values of the first speaker apparatus and the second speaker apparatus according to the ratio are set to the first speaker apparatus and the second speaker apparatus.

2. The audio system according to claim 1, wherein the set information includes one or more information of the following: (i) a delay time for outputting the audio signal and (ii) a sound effect of the audio signal.

3. The audio system according to claim 1, wherein the second speaker apparatus amplifies the audio signal in accordance with an amplifier rate based on the set information and outputs the amplified audio signal through a sound emission part.

4. The audio system according to claim 1, wherein the audio data is digital data; and wherein the first speaker apparatus transmits to the second speaker apparatus the audio data in packet form.

5. The audio system according to claim 1, wherein the second speaker apparatus 30 is a sub-woofer.

6. A method for audio processing in an audio system including a communication apparatus configured to store audio data, a first speaker apparatus having a first network interface configured to receive the audio data from the communication apparatus, the first speaker apparatus configured to output an audio signal based on the received audio data, and a second speaker apparatus having a second network interface configured to receive the audio data from the communication apparatus, and the second speaker apparatus configured to output an audio signal based on the received audio data, the method comprising the steps of:

receiving the audio data from the communication apparatus via the first network interface, by the first speaker apparatus;

detecting, by the first speaker apparatus, connection with the second speaker apparatus;

transmitting, by the first speaker apparatus, the audio data received from the communication apparatus and set information to the detected second speaker apparatus;

processing, by the second speaker apparatus, the audio data received from the first speaker apparatus in accordance with the received set information; and outputting, by the second speaker, an audio signal based on the processed audio data, wherein the set information includes one or more of the following: (i) a sound volume and (ii) a frequency band, and when a ratio of the volume value of the second speaker apparatus to that of the first speaker apparatus is previously set, the volume values of the first speaker apparatus and the second speaker apparatus according to the ratio are set to the first speaker apparatus and the second speaker apparatus.

7. The method according to claim 6, wherein the set information includes one or more information of the following: (i) a delay time for outputting the audio signal and (ii) a sound effect of the audio signal.

8. The method according to claim 6, further comprising:

amplifying, by the second speaker apparatus, the audio signal in accordance with an amplifier rate based on the set information, wherein in the outputting process, the amplified audio signal is output through a sound emission part of the second speaker apparatus.

9. The method according to claim 6, wherein the audio data is digital data; and wherein in the transmitting process of the communication apparatus, the first speaker apparatus transmits to the second speaker apparatus the audio data in packet form.

10. The method according to claim 6, wherein the second speaker apparatus is a sub-woofer.

11. The audio system according to claim 1, wherein a first set information set to the first speaker apparatus is different in band from a second set information set to the second speaker apparatus.

12. The method according to claim 6, wherein a first set information set to the first speaker apparatus is different in band from a second set information set to the second speaker apparatus.

* * * * *